United States Patent

[11] 3,540,769

[72] Inventor Gerald E. Rosser
1449 8th Ave. S, Seattle, Washington 98168
[21] Appl. No. 724,488
[22] Filed April 26, 1968
[45] Patented Nov. 17, 1970

[54] AUTOMATIC HAND HELD SNARE
8 Claims, 5 Drawing Figs.
[52] U.S. Cl. .................................................. 294/19,
43/6, 119/153, 294/61
[51] Int. Cl. ..................................................... A01m 23/34,
A01k 81/04
[50] Field of Search............................................ 294/19, 23,
24, 61; 43/5, 86, 87, 6; 119/151, 153, 154

[56] References Cited
UNITED STATES PATENTS
2,616,123 11/1952 Armstrong ..................... 43/87

FOREIGN PATENTS
530,122 9/1956 Canada ......................... 43/87
891,814 3/1962 Great Britain ................. 43/5

Primary Examiner—Evon C. Blunk
Assistant Examiner—W. Scott Carson
Attorney—Graybeal, Cole and Barnard ABSTRACT: The snare has an elongated two part body formed by an elongated first member having a handle at one end and a cable clamp at the other end. An elongated, tubular second member telescopically surrounds the end portion of the first member opposite the handle. A closed loop portion of a snare cable extends endwise outwardly of the free end of the second member. The two end portions of the cable extend through the second member up to the clamp and the clamp secures them to the first member. A compression spring housed in said second member biases the first and second members telescopically apart, to contract the loop. A lock, releasable by a trigger positioned adjacent the handle, holds the two members telescopically together in opposition to the spring force.

Patented Nov. 17, 1970
3,540,769
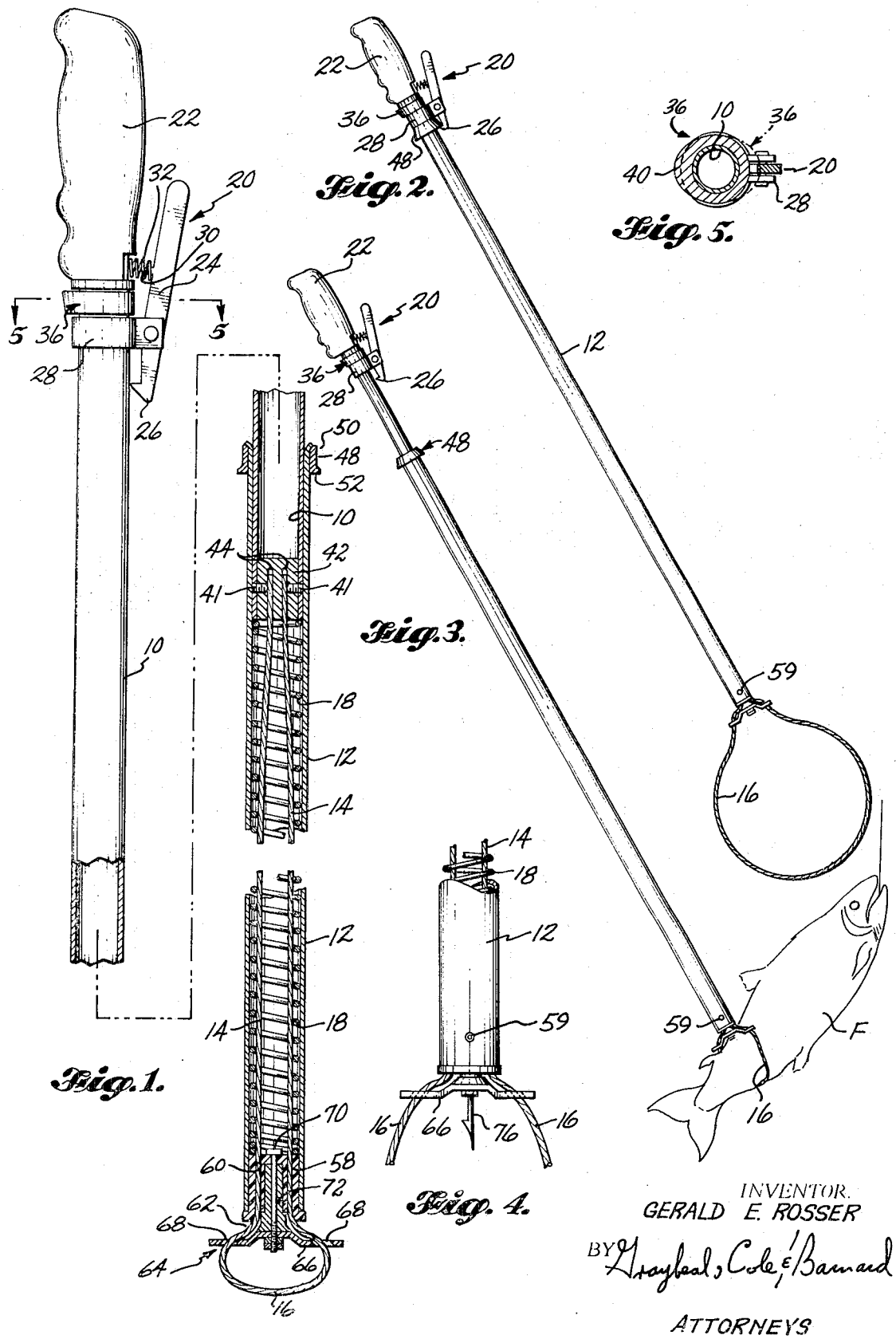
INVENTOR.
GERALD E. ROSSER
BY Graybeal, Cole & Barnard
ATTORNEYS

AUTOMATIC HAND HELD SNARE

BACKGROUND OF THE INVENTION

1. Field of the Invention

This invention pertains to snares, and particularly to powered animal snares (i.e. operated by means of other than manual power), such as snares suitable for landing fish, catching snakes, etc. in which a loop is automatically tightened around a body portion of the animal upon the release of a trigger.

2. Description of the Prior Art

Known devices for landing fish include nets, gaff hooks and manually operated snares. A net or a manually operated snare is unsuitable for use by the steelhead or stream salmon fisherman because their operation require the use of both of his hands. The stream fishermen must keep one hand free for holding the fishing rod and balancing himself while he lands the fish with the other hand. Gaff hooks require the use of only one hand. However, a gaff hook is quite dangerous to carry and handle by a stream fisherman. Also, sometimes it is desirable to release a fish relatively unharmed, and this is not possible if a gaff hook is used in landing the fish.

A particular known snare is the one disclosed in U.S. Pat. No. 2,522,454, issued Sept. 12, 1950 to Richard D. Lewry. This snare employs a flexible clamping band or strap which forms a closed loop that is manually tightened around a body portion of the fish. One disadvantage of this type of snare is, as pointed out above, that it requires the use of both hands of the operator to tighten the loop. A second disadvantage is that only one end of the band is moved to tighten the loop, necessitating a relatively large displacement or movement of the band to affect the degree of loop closure that is necessary.

U.S. Pat. No. 2,544,145, issued on Mar. 6, 1951 to Fred Ellwein discloses a spring powered snare for use in trapping mink and the like. However, such snare is neither operator held nor operator controlled from a handle, and is not of suitable construction for landing fish or grabbing a hold of snakes or other animals at a distance beyond arms length from the operator.

SUMMARY OF THE INVENTION

This invention pertains to an animal snare which is automatically powered, such as by a spring, and is released by the operator from a control trigger on the handle. The snare employs a closed loop that is expanded when the device is cocked and which is tightly and quickly closed about the body of the fish or other animal by a biasing force when the control trigger is actuated. The snare is elongated so that the operator may snare the animal (e.g. a fish) while he is at a distance from it, but is lightweight so that it is easy to manipulate during positioning of the loop around the animal.

The snare also employs a safety device to prevent the accidental closing of the loop and employs a unique arrangement for securing the loop on the snare so that it is closed in the shortest possible time.

In a modified form of the device, further gripping means, such as a barb, is provided to impale the fish as the loop is drawn tight and may be used either to kill an animal being snared or merely to hold the animal more securely.

BRIEF DESCRIPTION OF THE DRAWINGS

FIG. 1 is an elevational view separated into two parts due to a space limitation, with portions thereof in longitudinal section.

FIG. 2 is an elevational view showing the snare in a cocked position with the loop expanded.

FIG. 3 is an elevational view showing the snare in a released position with the loop tightened around the tail of a fish.

FIG. 4 is a fragmentary elevational view of a modified form of the invention which includes an impaling barb.

FIG. 5 is a transverse sectional view taken along line 5–5 of FIG. 1, and showing a safety ring in both an operative (broken line) and inoperative (solid line) positions.

DESCRIPTION OF THE PREFERRED EMBODIMENT

As best shown in FIG. 1, the snare basically includes an elongated body comprising an elongated first member 10, which may be tubular as is illustrated, and an elongated tubular second member 12 telescopically mounted on the first member, and a snare line shown in the form of a cable 14. The cable 14 is doubled and its two ends are secured to member 10, in a manner to be hereinafter explained in greater detail. The loop end portion 16 of cable 14 extends endwise outwardly of the free end of section 12. The remainder of cable 14 is housed within section 12. A compression spring 18, housed within section 12, normally urges or biases the two members telescopically apart, into a position wherein the loop is contracted.

The snare is cocked by telescopically moving the two sections 10, 12 together in opposition to the force of spring 18. A latch 20 adjacent handle 22 serves to hold the two sections in this cocked position, as will hereinafter be described in greater detail.

The first member 10 is best shown in FIG. 1 and is preferably constructed from a light metal tubing, such as aluminum tubing. However, other lightweight materials, such as fiberglas, for example, may be used, and member 10 may be made from solid stock, if desired. The handle 22 is preferably fitted with a hand grip (like a bicycle hand grip) made from rubber or plastic, which is frictionally retained on the upper end of member 10.

The latch 20 includes a hooked end portion 26. The latch 20 is pivotally mounted on a pin between parallel ear portions of a circular clamp 28 which encircles and is secured to member 10 adjacent the handle 22. The latch is provided with a small lug 30 which projects into, and holds, one end of a small coil spring 32. The opposite end of spring 32 abuts against the member 10, and is preferably retained in a well formed in member 10.

As is readily seen, when the latch is depressed the hooked end 26 is pivoted outwardly away from the fixed member. To prevent accidental triggering the member 10 is provided with a safety device, shown in the form of a latch disabling ring 36. Ring 36 snugly encircles member 10, but is loose enough to be rotatable by hand. It includes a radially thickened portion or lobe 40 (FIG. 5) which when rotated into the position shown in phantom lines in FIG. 5 will closely abut against the inner surface of the latch 20. With ring 36 in the position shown by solid lines in FIG. 5 enough clearance exists inwardly of the latch to permit its movement an amount sufficient to release the hook 26.

A plug 42 (FIG. 3) is fitted within the end of the member 10 opposite the handle 22. A pair of setscrews 41 are received in radial bores formed in the plug 42. The setscrews do not extend radially outwardly beyond the fixed member and thus will not interfere with the sliding action of the slidable member 12. The plug 42 is provided with two longitudinal bores 44 which receive the ends of the cable 14. The set screws 41 are threaded into tight engagement with the cable to securely hold or clamp the ends to member 10.

An important feature of this invention lies in the fact that both ends of the cable are secured to member 10 as a result, a force on the cable 16 caused by a snared object is directly felt at the handle 22.

In other words, if the operator wishes to pull a fish out of the water or drag an animal over the ground or the floor of the cage, the forces are transmitted directly between the cable and the handle.

The tubular member 12 is also constructed from a lightweight material such as aluminum or fiberglas tubing, or the like. It is provided at its upper end with an annular retainer ring 48 having a beveled surface 50 (FIG. 3) and an abutment surface 52. The ring 48 is adapted to slide relatively up under the hooked end 26 of latch 20 when the two sections 10, 12 are telescopically moved together.

A bearing 58 of nylon or the like is fitted into the free end of member 12 and is preferably held in place by setscrews 59

(FIG. 2). Bearing 58 is provided with two longitudinal bores 60 through which the cable 14 end portions slide. The bores are flared at their outer ends as at 62 to allow the cable to begin expanding into the loop 16.

A spreader 64 is provided to help shape the loop 16. Spreader 64 comprises a pair of oppositely extending apertured ears 66, the apertures 68 of which are spaced apart a sufficient distance to cause the formation of an oval loop. By way of typical and therefore nonlimitive example, in the preferred embodiment which is particularly useful in landing stream salmon or steelhead, the distance between the apertures 68 is approximately 1½ inches. The spreader 64 may be secured to member 12 by a bolt 70 which passes through a stiffener 72 fitted within a central aperture formed in the bearing 58. The loop 16 of the cable 14 is free to form outwardly of the spreader 64 and has sufficient space to pass between the spreader 64 and the bushing 58 when being cocked or released.

The biasing power for closing the loop 16 is, in the preferred embodiment, the compression spring 18. Other biasing means, such as compressed air or the like may be employed in other equipment.

As is best shown in FIG. 1, the spring abuts against the plug 42 at one end and the bushing 58 at its other end. The spring is compressed when the members 10, 12 are telescopically moved together, and when such members are freed the spring energy urges them telescopically apart.

FIG. 4 shows a modified form of snare which includes in addition to the aforementioned features a barb 76 which is secured to the spreader 64 and may be outer end portion of the bolt 70. The barb may be used to actually kill an animal or to merely assist in holding the animal from escaping the loop.

In the operation of the preferred embodiment, the snare is cocked or loaded by the operator telescopically sliding the members 10, 12 relatively together until the hook 26 drops over the ring 48. This action will compress the spring 18 between the plug 42 and bearing 58, storing energy in the spring. At this stage the loop 16 is expanded, as shown in FIG. 2. The safety cam 36 is then rotated so the lobe 40 abuts against the under side of the latch 20 to prevent accidental triggering. When the operator desires to use the snare, as for example when landing a fish F, the safety cam is rotated into the position shown by solid lines in FIG. 5, the loop 16 is placed over the tail of the fish; and trigger 20 is depressed, lifting hook 26 out from engagement with ring 48 and freeing the spring 18. The spring 18 then forces the members 10, 12 telescopically apart, and in so doing decreases the size of loop 16, causing it to tighten about the fish, as shown in FIG. 3.

It is to be understood that while the snare construction which is illustrated and described constitutes the preferred form of the invention, it is capable of variation and modification without departing from the invention. For example, the cable could be one of the various forms of wire rope or could be a metal or plastic strap, or a nylon cord. Telescoping members need not be used but rather the cable clamp could be slidable in a single tubular member. Other variations are also apparent. It is to be understood, therefore, that the scope of the invention is not to be limited by the precise details which are illustrated and described but only be proper interpretation of the appended claims.

I claim:

1. A snare for hand held use, comprising:
   an elongated first member having a handle;
   a tubular second member telescopically mounted on said first member, said tubular member being slidable along said first member between a cocked position wherein it is slid toward said handle and an extended position wherein it is spaced from said handle;
   releasable holding means for holding said tubular member in said cocked position;
   means for biasing said tubular member into said extended position;
   flexible line means slidably received in said tubular member and having at least one end fixed to said first member, said line means forming a loose loop when said tubular member is in said cocked position and a tight loop when said tubular member is in said extended position; and
   hand operated means adjacent said handle for releasing said holding means to cause said biasing means to extend said tubular member.

2. The snare defined by claim 1, further including a spacer member secured to said tubular member and having laterally spaced openings for receiving said line means adjacent said loop.

3. The snare defined by claim 1, wherein said holding means includes a catch member secured to said tubular member and said releasing means includes a releasable latch secured to said first member adjacent said handle.

4. The snare defined by claim 3, further including safety cam means on said first member which is selectively rotatable into a position in which it prevents operation of said latch.

5. The snare defined by claim 1, wherein said biasing means is a compression spring having an inner end abutting said first member, said tubular member including a guide member fixed to said tubular member adjacent said loop, and said spring also having an outer end abutting said guide member.

6. The snare defined by claim 5, wherein said line means has both ends secured to said first member.

7. A compression spring powered snare for hand held use, comprising:
   an elongated first member having a handle at one end;
   a snare line having first and second ends secured to the first member and a loop portion between said ends;
   a tubular second member telescopically surrounding both said first member and a portion of said snare line;
   a guide member at the end of the second member farthest from said handle, said guide member having passage space therein for the two sides of the looped snare line, with the line having a closed bight portion outboardly of said guide member;
   a compression spring within said second member, and at one of its ends contacting the guide member and its other end contacting the first member, said compression spring serving to bias the second member towards an extended position in which the snare line makes a tight loop outwardly of said second member; and
   releasable lock means for holding the second member in a retracted position relatively toward said handle, in which position the snare line makes a loose loop outwardly of said second member, said releasable lock means including trigger means adjacent the handle and positioned to be operable by the hand which holds the handle.

8. The snare defined by claim 7, wherein said releasable lock means comprises a ring on the second member and a catch on said first member having a hook portion for engaging said ring.